(12) United States Patent
Nemirovsky et al.

(10) Patent No.: US 6,292,888 B1
(45) Date of Patent: Sep. 18, 2001

(54) REGISTER TRANSFER UNIT FOR ELECTRONIC PROCESSOR

(75) Inventors: Mario D. Nemirovsky, Saratoga; Adolfo M. Nemirovsky, San Jose; Narendra Sankar, Santa Clara, all of CA (US)

(73) Assignee: Clearwater Networks, Inc., Los Gatos, CA (US)

( * ) Notice: Subject to any disclaimer, the term of this patent is extended or adjusted under 35 U.S.C. 154(b) by 0 days.

(21) Appl. No.: 09/240,012

(22) Filed: Jan. 27, 1999

(51) Int. Cl.$^7$ .......................... G06F 13/16; G06F 13/38; G06F 12/02; G06F 9/28
(52) U.S. Cl. .................. 712/225; 712/228; 712/248; 712/217; 711/169; 711/149; 711/144; 711/123; 711/126; 710/33; 709/108
(58) Field of Search ..................... 711/168, 169, 711/173, 147, 149, 150, 119, 121, 123, 124, 125, 129, 126, 144; 712/208, 209, 220, 215, 225, 23, 222, 41, 200, 202, 47, 201, 206, 207, 213, 228, 748; 709/108; 710/33; 345/545

(56) References Cited

U.S. PATENT DOCUMENTS 5,309,173 * 5/1994 Izzi et al. .............................. 345/545
5,852,726 * 12/1998 Lin et al. .............................. 712/200

* cited by examiner

Primary Examiner—Daniel H. Pan
(74) Attorney, Agent, or Firm—Donald R. Boys; Central Coast Patent Agency, Inc.

(57) ABSTRACT

A processing system has an instruction processor (IP), register files for storing data to be processed by the IP, such as a thread context, and a register transfer unit (RTU) connected to the register files and to the IP. Register files may assume different states, readable and settable by both the RTU and the IP. The IP and the RTU assume control of register files and perform their functions partially in response to states for the register files, and in releasing register files after processing, set the states. The invention is particularly applicable to multistreamed processors, wherein more register files than streams may be implemented, allowing for at least one idle register file in which to accomplish background loading and unloading of data. The invention is also particularly applicable to processing systems dealing with real-time phenomena, such as data packet processing in network routers.

38 Claims, 3 Drawing Sheets

REGISTER TRANSFER UNIT FOR ELECTRONIC PROCESSOR

FIELD OF THE INVENTION

The present invention is in the area of digital processors of all sizes and sorts, and pertains more particularly to apparatus and methods for loading and storing of information to and from registers files for such processors.

BACKGROUND OF THE INVENTION

An electronic processor, such as a microprocessor used in a personal computer or network device, contains registers that hold values upon which the processor's instructions act directly. To perform a simple integer addition instruction, for example, integers are loaded into each of two registers. The addition instruction operates upon the integers in the two registers and stores the resulting sum in a third register. Typically, the resulting sum is then saved in a memory location by another instruction. The three registers are then free to be used for a following instruction.

Typical processors have several registers. In some designs in the art, the registers are designed for general-purpose use. In others, particular registers are designed for specific purposes, such as to accumulate the results of calculations or to hold pointers to memory addresses. The collection of all such registers is known in the art as a register file.

When one program or program thread finishes executing and another begins, or an interrupt service routine is invoked, a context change must take place. This change is known in the art as a context switch. When a context switch takes place, the last values in the registers may have to be saved for later use. Once such values are saved, the context of the new thread must be loaded. The context consists at least of the address in memory of the first instruction of the thread, which is loaded into a program counter, and the initial values of registers. After the context switch, the first instruction of the new thread, as indicated by the program counter, is fetched and executed, operating upon the new initial register values.

For the purposes of the present disclosure it is important that some distinctions be made in parts of a processor. Depending on the nature of a processor for example, there may be relatively few distinct parts, or there may be a larger number of parts. Some processors are highly dedicated to a single function (embedded microcontrollers for example), and others have multiple functions, having such as fetch units, load/store units, and multiple functional units for executing instructions, such as integer units, floating point units, and branch prediction units. Also, the terminology in the art is loosely applied as to what precisely is a processor, a CPU, a microprocessor, and so on.

Regardless of the loosely applied terminology in the art and imprecise definitions, a clear distinction can be made for the purpose of the present descriptions. A distinct part of a processor of any sort executes instructions from an instruction stream. Other parts of a processor do not. For the purpose of the present description the part of any processor that executes instructions will be termed the instruction processor (IP).

In conventional processors in the prior art, a context switch is performed by a sequence of instructions executed by the IP, like any other program. Store instructions are executed by the IP to save register values to main memory or cache, and load instructions are used by the IP to fetch new register values from main memory or cache. Since there are typically several register values to be stored and several more to be loaded, a number of instructions are typically required, using a relatively long period of time in IP cycles. In processors with instructions that load and store blocks of memory, the process can be accelerated, but significant IP overhead is still involved.

Instructions that load and store from memory or cache typically take longer to execute than instructions that operate directly on register contents, so the time required for a context switch is even longer. For these two reasons, a context switch consumes a relatively large number of IP cycles. While the IP is occupied with a context switch, no useful calculations associated with the old or the new thread are executed. The context switch is thus pure overhead. Because context switching is a critical operation that must be completed before any other thread can run, no programs can be allowed to interrupt the context switch.

Having the IP completely unavailable for an extended period has been a major obstacle in system design. For example, it can interfere with the timely servicing of interrupts or the response to real time inputs.

In many systems context switching occurs so frequently that a relatively large proportion of processing capability is wasted. For example, in a personal computer where interrupts are used to service I/O devices, a context switch may occur each time an interrupt service routine is invoked. The burden of context switching is particularly high in real time systems that are required to respond quickly to many inputs. The bottleneck of context switching has remained a long-standing problem in processor design that has not been adequately addressed in the prior art.

The present invention represents a solution to this long-standing problem, at a cost of very little added logic in the system design. In the present invention a new register transfer unit loads and stores register values independently of the IP and in parallel with the processing of normal instructions. No load and store instructions are executed by the IP for data transfer to and from register files.

SUMMARY OF THE INVENTION

In a preferred embodiment of the present invention an electronic processing system is provided, comprising at least two register files; an instruction processor coupled to the at least two register files for processing instructions using data in the register files; a data repository; and a register transfer unit coupled to the at least two register files and the data repository. Both the instruction processor and the register transfer unit are enabled to alter the states for the register files, and wherein the instruction processor and the register transfer unit take control of a register file only according to specific states of the register files.

In this embodiment a register file is never under control simultaneously of the register transfer unit and the instruction processor. Also in this embodiment register files exist in any one of five states, a first state indicating a file is in use by the instruction processor, a second state indicating the register file is released by the instruction processor with valid data to be stored, a third state indicating the register file is under control of the register transfer unit, a fourth state indicating the register file has no valid data and is available, and a fifth state indicating the register file is loaded with valid data and is ready for processing by the instruction processor. Typically a register file passes from state 1, to state 2, to state 3 wherein the register transfer unit unloads valid data from the register file, to state 4, back to state 3 wherein the register transfer unit loads new valid data to the register file, to state 5, and back again to state 1.

In some cases a register file may pass from state 1, directly to state 4, to state 3 wherein the register transfer unit loads new data, to state 5, and back again to state 1. Status may in some cases be maintained for data as well as for register files, and the register transfer unit may then take control of a register file according to both a register file state and a data state.

In some embodiments the instruction processor, the first and second register files, and the register transfer unit are all implemented as semiconductor elements on a single chip. In other the instruction processor, the first and second register files, the register transfer unit, and the data repository are all implemented as semiconductor elements on a single chip.

In some preferred embodiments the processing system is a multi-streaming system having plural hardware streams, the instruction processor being capable of simultaneously processing instructions from plural threads running in the plural streams, and the number of register files is at least one more than the number of active streams, one register file then being available to be controlled by the register transfer unit while the instruction processor executes instructions in all of the active streams, controlling one register file for each of the active streams.

In many embodiments data transferred into a register file constitutes a context switch. Also in some embodiments the instruction processor causes a thread context to be stored in a specific register file, and to remain in the specific register file while plural context switches occur in one or more other register files. In still other embodiments the register transfer unit has at least one interrupt input, and, in response to an interrupt on the interrupt input, the register transfer unit loads specific data to a register file and in turn interrupts the instruction processor.

In another aspect of the invention a for transferring data between register files and a data repository in an electronic processor is provided, comprising steps of (a) providing for register files to have unique states settable by either an instruction processor or a register transfer unit; (b) assuming control of register files by the register transfer unit for transferring data only under specific first states for register files; (c) assuming control of register files by the instruction processor for processing data in the register files only under a specific second state for register files; and (d) setting state for a register file by either the register transfer unit or the instruction processor each time the register transfer unit or the instruction processor finishes operating with a register file. In preferred embodiments, in steps (b) and (c), an individual register file is never under control of the register transfer unit and the instruction processor simultaneously.

Also in preferred embodiments register files exist in any one of five states, a first state indicating a file is in use by the instruction processor, a second state indicating the register file is released by the instruction processor with valid data to be stored, a third state indicating the register file is under control of the register transfer unit, a fourth state indicating the register file has no valid data and is available, and a fifth state indicating the register file is loaded with valid data and is ready for processing by the instruction processor. Typically a register file passes from state 1, to state 2, to state 3 wherein the register transfer unit unloads valid data from the register file, to state 4, back to state 3 wherein the register transfer unit loads new valid data to the register file, to state 5, and back again to state 1. In some embodiments, however, a register file may pass from state 1, directly to state 4, to state 3 wherein the register transfer unit loads new data, to state 5, and back again to state 1. In some embodiments status may be maintained for data as well as for register files, and the register transfer unit takes control of a register file according to both a register file state and a data state.

In some preferred embodiments of this method the processing system is a multi-streaming system having plural hardware streams, the instruction processor is capable of simultaneously processing instructions from plural threads running in the plural streams, and the number of register files is at least one more than the number of active streams, one register file then being available to be controlled by the register transfer unit while the instruction processor executes instructions in all of the active streams, controlling one register file for each of the active streams.

In yet another aspect of the invention a method for context switching in an electronic processor having more register files than instruction streams, comprising steps of (a) assuming control of a first register file having a first valid context by an instruction processor, setting a state for the first register file to a first state indicating the register file is under control of the instruction processor, and executing instructions using data in the first register file; (b) releasing control of the first register file by the instruction processor, and setting the state for the first register file to a second state indicating the register file is released by the instruction processor with valid data to be stored, and assuming control of a second register file in a fifth state by the instruction processor, the second register file having a second valid context, and setting the second register file to the first state indicating the second register file is under control of the instruction processor; (c) assuming control of the first register file in the second state by a register transfer unit, setting the state of the register file to state 3, transferring data in the first register file to a data repository, and setting the first register file to a fourth state indicating the first register file is empty of valid data and available for a new context; and (d) assuming control of the first register file in the fourth state by the register transfer unit, loading the first register file with a second valid context, and setting the first register file to the fifth state indicating the first register file has a valid context loaded and is ready for use by the instruction processor.

In this method in some embodiments, the instruction processor checks for a register file in the fifth state as a precondition for assuming control of the register file, and in step (c) the register transfer unit checks for a register file in the second state as a precondition to assuming control and transferring valid data from the register file into the data repository. Further, in step (d) the register transfer unit checks for a register file in the fourth state as a precondition to loading the register file with a new valid context.

In some embodiments, in step (d) the register transfer unit assumes control of a register file in state 4 as a result of an interrupt signal directed to the register transfer unit, and the data loaded to the register file is specific to the interrupt.

In yet another aspect of the invention a computing machine is provided, comprising data input and data output apparatus; an electronic memory; and an electronic processing system having at least two register files, an instruction processor coupled to the at least two register files for processing instructions using data in the register files, a data repository, and a register transfer unit coupled to the at least two register files and the data repository. Both the instruction processor and the register transfer unit are enabled to alter the states for the register files, and wherein the instruction processor and the register transfer unit take control of a register file only according to specific states of the register files.

In this computing machine a register file is never under control simultaneously of the register transfer unit and the instruction processor. Typically in this machine register files exist in any one of five states, a first state indicating a file is in use by the instruction processor, a second state indicating the register file is released by the instruction processor with valid data to be stored, a third state indicating the register file is under control of the register transfer unit, a fourth state indicating the register file has no valid data and is available, and a fifth state indicating the register file is loaded with valid data and is ready for processing by the instruction processor. Typically a register file passes from state 1, to state 2, to state 3 wherein the register transfer unit unloads valid data from the register file, to state 4, back to state 3 wherein the register transfer unit loads new valid data to the register file, to state 5, and back again to state 1. In some cases however, a register file passes from state 1, directly to state 4, to state 3 wherein the register transfer unit loads new data, to state 5, and back again to state 1.

In some cases status may be maintained for data as well as for register files, and the register transfer unit may take control of a register file according to both a register file state and a data state. The instruction processor, the first and second register files, and the register transfer unit may all be implemented as semiconductor elements on a single chip, and in some cases the chip may include the data repository as well.

In some preferred embodiments of the computing machine the processing system is a multi-streaming system having plural hardware streams, the instruction processor is capable of simultaneously processing instructions from plural threads running in the plural streams, and there are a number of register files at least one more than the number of active streams, one register file then being available to be controlled by the register transfer unit while the instruction processor executes instructions in all of the active streams, controlling one register file for each of the active streams.

In many cases data transferred into a register file may constitute a context switch. Also, the instruction processor may cause a thread context to be stored in a specific register file, and to remain in the specific register file while plural context switches occur in one or more other register files.

In some embodiments of the multi-streaming computing machine the data input and output apparatus comprises an application specific integrated circuit (ASIC) connected to a packet data network, the electronic memory comprises a data cache, and the computing machine is an Internet Protocol router dedicated to processing data packets.

In other embodiments the register transfer unit has at least one interrupt input, and, in response to an interrupt on the interrupt input, the register transfer unit loads specific data to a register file and in turn interrupts the instruction processor.

In yet another aspect of the invention an Internet Protocol data router is provided, comprising a data cache; a data interface connected to a data packet network for reading communicating data to and from the network through the data cache; and a multi-streaming processor comprising at least one more register file than active streams in the multi-streaming processor, the register files coupled to the data cache by a bus, an instruction processor coupled to the multiple register files separate from the bus, and a register transfer unit enabled to control the bus for transferring data between the register files and the data cache. The instruction processor assumes control of register files for processing instructions using the register files, and the register transfer unit assumes control of register files for transferring data between the register files and the data cache, and control of register files is according to states set for the register files by either the instruction processor or the register transfer unit, no register file being under control of the register transfer unit and the instruction processor simultaneously.

In this data router, as in many other embodiments of the invention there may be five states for any individual register file, a first state indicating the register file is controlled by the instruction processor, a second state indicating the register file is released by the instruction processor with valid data to be stored, a third state indicating the register file is controlled by the register transfer unit, a fourth state indicating the register file is empty of data and available, and a fifth state indicating the register file is loaded with valid data to be processed.

Also in some embodiments of the data router, in releasing a register file in state 1 by the instruction processor the instruction processor sets the state to either state 2 or state 4, depending on presence of valid data to be stored in the register file, the register transfer unit, upon assuming control of a register file in either of state 2 or state 4 sets the state to state 3, and loads or unloads data depending on the state when acquired, the register transfer unit, in releasing control of a register file after unloading data sets the state of the register file to state 4, and releasing a register file after loading data sets the state to 5, and wherein the instruction processor, assuming control of a register file in state 5 sets the state to 1.

In various aspects and embodiments of the invention taught in enabling detail below, processors are made available to the art wherein a significant portion of the usual workload of the processor is assumed by one or more unique register transfer units, thereby providing a significant increase in processing power with a relatively minor investment.

DESCRIPTION OF THE PREFERRED EMBODIMENTS

Figure 1:
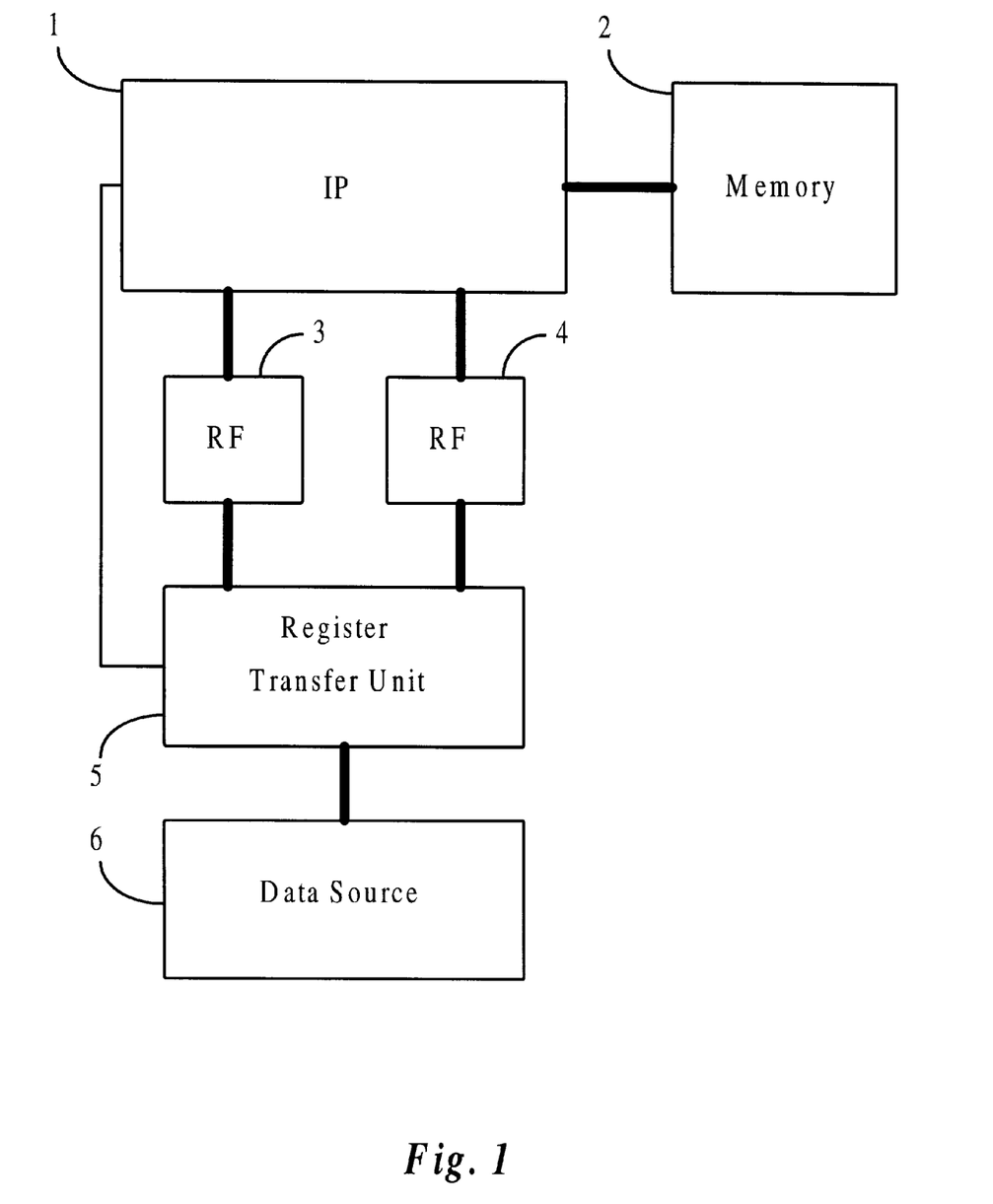
FIG. 1 is a block diagram showing the principal components of a register transfer unit servicing two register files in a preferred embodiment of the present invention.

FIG. 1 is a block diagram of a simplified system architecture in a preferred embodiment of the present invention, and shows an instruction processor (IP) 1, two register files 3 and 4, and added components for register file transfer. For ordinary instructions and data, IP 1 comprises a memory load/store unit, and uses memory 2 as in the prior art. Register transfer unit (RTU) 5 is a new and unique functional element that comprises logic to transfer register values between either register file and a data source 6. In this example register files have five basic states: (1) in use by (under control of) the IP, (2) released by the IP with processed data to be stored, (3) under control of the RTU, (4) empty of valid data, and (5) contains data to be processed.

In some cases there may be one or more sub-states. In preferred embodiments of the invention a register file status indicator for each register file, which may be bits set as flags, is maintained, and is capable of indicating the basic state of a register file and also any sub-state.

A register file is thus never simultaneously controlled by the RTU and the IP. In embodiments of the present invention the unit (IP or RTU) in control of a register file can modify the contents of registers in the register file. In the prior art, typically only the IP has had control of registers in a register file.

Data source 6 may comprise any device capable of storing data, including, but not limited to fast scratchpad memory, a data cache, main memory or an I/O device. It will be apparent to the skilled artisan that the IP, register files, and register transfer unit, as well as other elements shown or not shown may all be implemented as a part of a single integrated circuit, or may exist as a chip set comprising two or more semiconductor devices.

The system in the embodiment as shown in FIG. 1 can be used for multiple purposes including but not limited to context switching. A typical sequence of operations involved in the system of FIG. 1, for example, is shown in flowchart FIG. 2. The left column of the figure shows generally operations performed by the IP; the right column shows generally operations performed by the RTU. In this example the term 'context switching' may be taken to mean generally those operations involved in loading and unloading data to and from register files.

Figure 2:
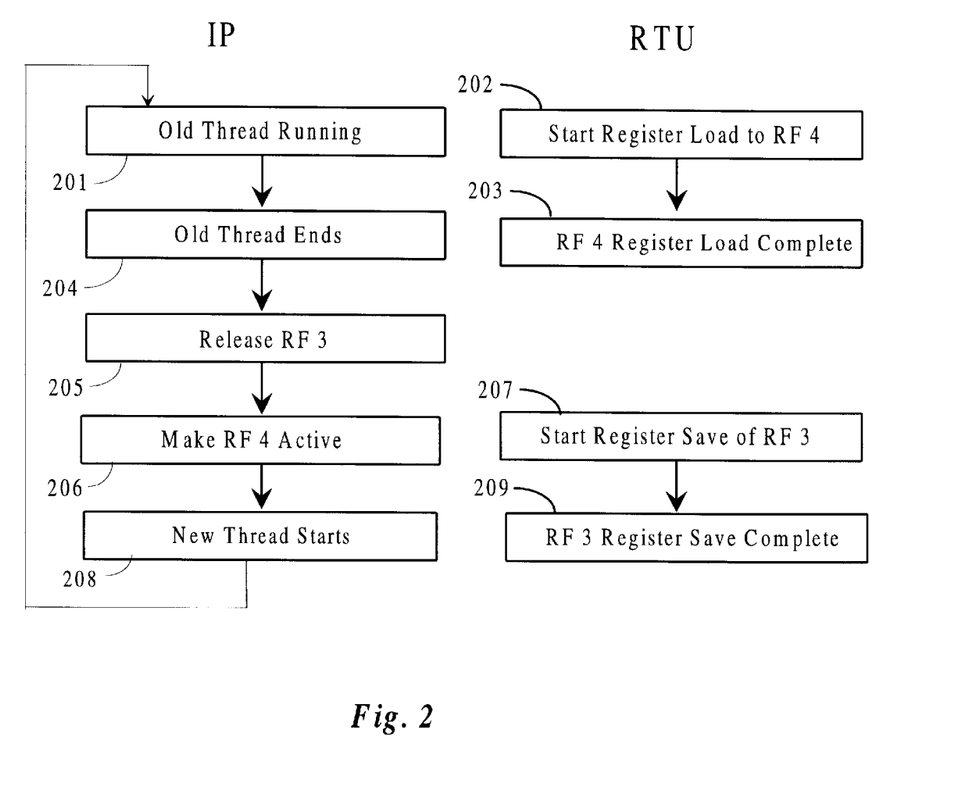
FIG. 2 is a flow chart showing a sequence of steps involved in a context switch in a preferred embodiment of the invention.

Assume for the purpose of this example that when a context switch is to begin the IP is currently running an old thread in step 201, which is operating upon the values in register file 3 (in state 1) and that register file 4 is empty (state 4), and available to the RTU for loading new data. In step 202, the RTU responds to an internal or external event indicating a new data set is available for loading to a register file, and determines register file 4 is available to be loaded. While the old thread continues to run, the RTU assumes control of register file 4, sets it state to state 3, and transfers appropriate data from data source 6 into register file 4. While these values are being loaded, processing of the old thread by the IP continues.

When the old thread ends in step 204, the RTU has, in this example, already loaded the new data set into register file 4 in step 203, and has set a status flag that indicates the register file has valid data and is available for the IP for instruction execution (state 5). The IP at some point, having finished operations using register file 3, yields control of register file 3 in step 205, and sets a flag that register file 3 is released (state 2). The IP determines in step 206, by checking the flag set by the RTU, that register file 4 has a new, valid context, and begins processing of the new thread in step 208, using register file 4. Meanwhile the RTU, in response to the state of register file 3 released by the IP in step 205, initiates storing of the data in register file 3 in step 207, setting the state to state 3. While the store of register file 3 completes in step 209, the new thread continues running uninterrupted. Also, when the store of register file 3 is complete in step 209, the RTU sets the state to state 4 as available to be loaded with new data. At some later time the RTU again takes control of register file 3 in state 4, setting the state to state 3, and loads new valid data to the register file. At the completion of loading the RTU sets the state for register file 3 to state 5, as available for the IP, and so on.

There are some options in sequence of operations that may take place. For example, in the process of releasing a register file by the IP, a register file may or may not have valid data to be stored. If there is valid data to be stored, transition is to state 2. If there is no valid data, transition may be directly to state 4. Further, if there is valid data to be stored, there may be in some cases a difference in the treatment of the data to be stored, as for example, where to store the data. In this case there may be, as described above, one or more sub-states. The same is true of state 3, for example. State 3 says generally that the register file is under control of the RTU. There may also be sub-states indicating, for example, whether data is being unloaded or loaded.

The process described in this example repeats when a next transition takes place, except that the roles of the two register files are reversed. In this way, data loading and unloading takes place in the background while instruction processing continues in the foreground. No instructions by the IP are necessary to save and load contexts, compared with the many long load and store instructions that are necessary for load and store by a conventional IP without an RTU.

The state of register files is important to the operation, and in a preferred embodiment flag bits, comprising a state indicator for each register file, are maintained and amendable (settable) by the RTU and the IP at each juncture (transition) that state may change for a register file. There are, in a preferred embodiment, as described above, five basic states for a register file, and in some cases, there are sub-states, which may be indicated by additional flag bits or in some other manner. A skilled artisan will understand that there may be a variety of ways that register file state may be changed and maintained. A typical sequence for a single register file, say register file 3 in the above example, is as described above, from state (1) in use by (under control of) the IP, to state (2) released by the IP and containing valid data to be stored by the RTU, to state (3) under control of the RTU being emptied of valid data, to state 4, released by the RTU empty of valid data and available to the RTU for a new context, back to state (3) under control of the RTU being loaded with new data, and to state (5) loaded by the RTU with a new context and ready for the IP; after which the sequence continues. It is not required that the sequence of state changes remain the same for a register file.

Further to the above description, the operation may be viewed from the viewpoint of the IP and the RTU in terms of needed conditions for particular actions. From the viewpoint of the RTU, to initiate storing of valid data from a register file, an operation that may be termed RTU_Out, there must be a register file released by the IP with valid data to be stored. To load new data to a register file, (RTU_In) the RTU has to verify three conditions: (a) a register file released by the IP (b) no valid data in the register file, and (c) valid data available to be loaded.

The RTU in the above example is a configurable device or logic set. That is, it may be configured to operate in a certain manner, triggered by the occurrence of specific events, such as register file state changes, appearance of data to be processed, and so on. Other events may participate as well in some embodiments, such as external interrupts, which may be directed to the RTU rather than to the IP. In some processors according to embodiments of the present invention, for example, an interrupt controller may provide an interrupt signal which is specific to an RTU on the processor, which will then look for a register file in state 4, load that register file with a context specific to the interrupt, and itself interrupt the IP to jump to an interrupt service routine using the newly loaded register file.

Some RTUs may be once-configured, and perform according to a single configuration. Some RTUs in other embodiments may be configurable by the IP, and may therefore be vectored to any one of perhaps several available configurations. In different configurations the RTU may set flags, load and unload registers, and the like, in response to different, configuration-specific, event sets. In some embodiments there may be more than one RTU having the same or different configurations, and so on.

The present example, with two register files, presumes a relatively simple single-streaming processor. Note that in this case there is a spare, or floating register file which may be under control of the RTU while the IP operates on the other, active register file. In other, more sophisticated embodiments the processor may be a multi-streaming processor capable of simultaneously processing several threads, the number of instruction threads being processed typically equal to the number of active streams. In these cases, in embodiments of the present invention, there will be at least one more register file than the number of streams that are active at any point in time. For example, in a multi-streaming processor having four active hardware streams, capable of running four software threads simultaneously, in embodiments of the present invention there will be at least five register files so at least one register file will be available to be released to the RTU while the IP continues to work on four threads in the four active streams.

Therefore, as described above, in certain designs, such as, for example, multi-streaming processors adapted to run multiple instruction streams in parallel, it will be advantageous to have at least one more register files than the number of streams that are active at any time. Instead of simply swapping two registers files, new data is loaded in any available register file in state 4, assuming valid data is available to load, and a flag is then set by the RTU for that register file for state 5. In some cases, with more than one extra register file available, an old context can be saved in any available register file. In further embodiments extra register files can be used to keep frequently-used contexts available for instant use. For example, if there are applications that may have heavy but perhaps intermittent use, such as a heavily used interrupt service routine, that context may be placed in one of the extra register files and locked, so that the context is not removed from that register file when the IP is operating on a different register file. The locked context is then available for instant use by the IP, saving many cycles. In this discussion the term locked may be taken in a relative sense. In such an embodiment there would typically be a process for unlocking such a register file and using it for another context, and that process would be a part of at least one available configuration for an RTU. In another example, if data source 6 is relatively slow, transfer to multiple extra register files can be initiated well in advance of their use.

Likewise, in some preferred embodiments, as described also above, there may be more than one RTU. Having more than one RTU can benefit certain designs in any of several ways. Multiple RTUs can operate in parallel to further accelerate processing. For example, in a system with two RTUs, one could be dedicated to storing contexts and/or data sets, while the other to loading contexts and/or data sets into a different register file. In such cases, it will be apparent to the skilled artisan, having the benefit of the teaching of this specification, that the correct operations may be a part of available configurations for a configurable RTU.

Depending on design goals for a system embodying features of the present invention, data source 6 may take any one of perhaps many forms. Any method of data storage can be used. For the highest system performance, high speed scratchpad memory can be used, for example, capable of transfers within one processor cycle.

In some embodiments, benefits of the present invention can be obtained even if slow main memory or even an I/O device is used to store register values. If a context switch is initiated long enough in advance before a new thread becomes active, transfers can still be completed in the background while the old thread continues to run. In this manner the speed limitation of the data source can be made to have little or no impact on processing.

As described above, an RTU according to various embodiments of the present invention is a configurable entity which, in operation, follows any of one or more configurations. By a configuration is meant an internal setup that the RTU will follow in response to events, much like a state machine. In some cases an RTU may be constrained to a single configuration, and therefore will always operate in the same manner in response to monitored events. In other embodiments an RTU will have more than one assumable configuration, and can be vectored from one to another by, for example, the instruction processor, by a particular combination of monitored events, or by a configuration signal from off-chip. The important point here is not how a configuration change takes place (a skilled artisan will recognize this may be done in a variety of ways), but that an RTU may be configurable.

In various embodiments of the invention the nature of data transfers that may be made by an RTU in response to events is a function of the current configuration. That is, the RTU may transfer a single data word from a register in a register file to a location in memory or vice-versa, or may do a block transfer, depending on the current configuration being followed.

The present invention applies to essentially any processing device using one or more registers. For example, a network router is a device used for transferring data packets in a data communications network. In a preferred embodiment of the present invention such a router may contain a specialized processor that executes multiple threads for such functions as packet forwarding, quality of service negotiation and updating of routing tables. Special working areas in the system store packet headers and payloads for various types of packets and other types of data.

Some network protocols and levels of service require time-critical forwarding of data. The unavailability of the processor for an extended period during context switching in this environment could interfere with real-time response. By performing context switching in the background or by transferring currently inactive registers, as taught by the present invention, this problem can be solved. A register transfer unit in such a processor can be designed specifically to handle commonly needed transfers, with knowledge of the standardized content of common types of data that flow through the router, such as Internet Protocol (IP), Asynchronous Transfer Mode (ATM).

Figure 3:
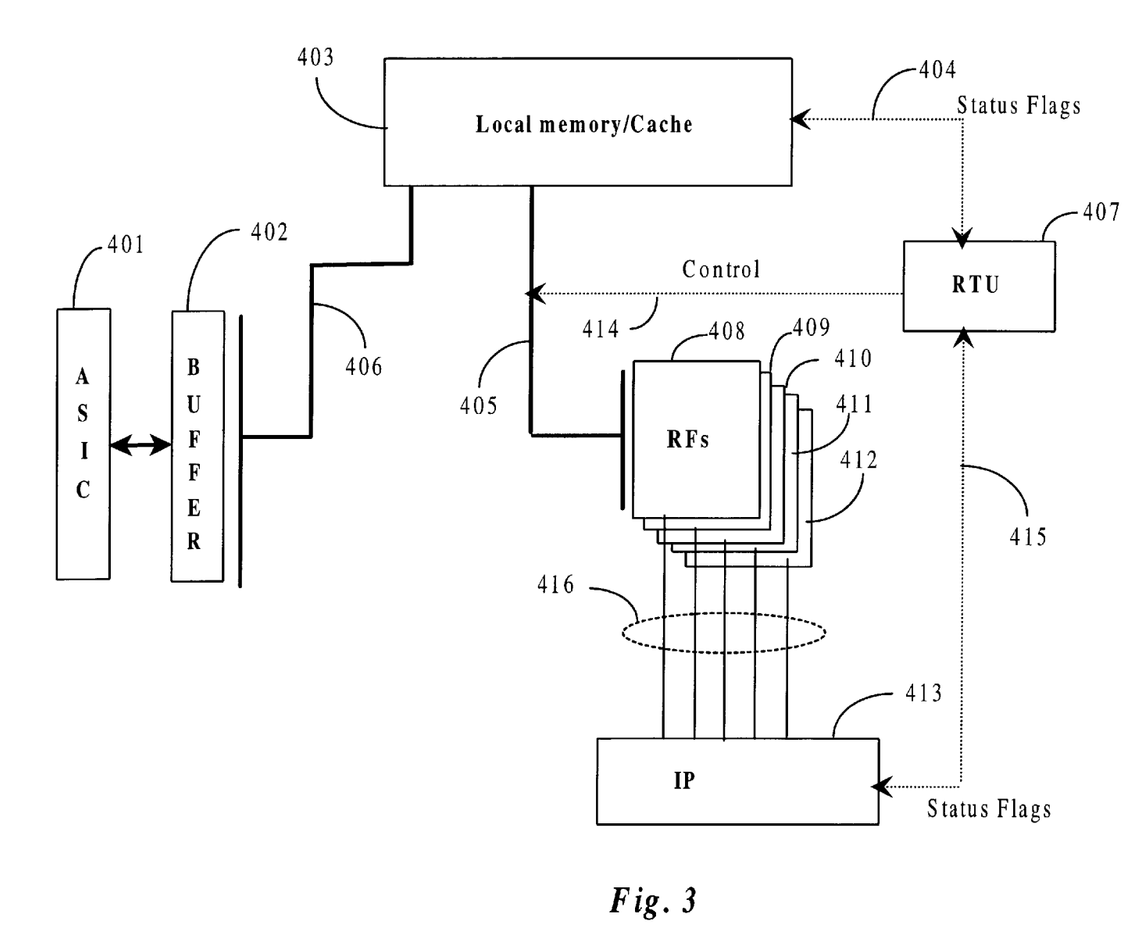
FIG. 3 is a diagram of an IP-router according to an embodiment of the present invention.

FIG. 3 is a diagram in one preferred embodiment of a data packet router, such as an Internet Protocol router. In this embodiment an application specific integrated circuit (ASIC) 401, is connected to a data packet network, such as the Internet (not shown). The ASIC receives serial data from the network and provides in response digital bytes representing the packets in a buffer 402, which transfers the packet data by path 406 to a local memory/cache 403. The appearance of data packets in cache 403 causes one or more flags to be set (404) indicating data ready for processing.

An IP 413 is responsible for all instruction processing, and in preferred embodiments is an IP capable of processing instructions from multiple instruction streams simultaneously. There are in this embodiment a plurality of register files (RFs) 408–412 (in this case five RFs). There will typically be at least one more register files than streams, so the processor in this embodiment may be taken, for example, to have four streams. The RFs and cache 403 are connected by a communication path 405.

An RTU 407 in this embodiment is responsible for loading new packet data from cache 403 to RFs 408–412, for processing by IP 413, and for storing valid data from the RFs to cache 403 after processing is complete, from where the data may be re-issued as packets on the connected network. In other embodiments data unloaded from register files may take a different path to be reissued on the network.

RFs may be controlled in this embodiment either by IP 413, as when processing data by executing instructions, or by the RTU, in transferring data between the RFs and the cache. Any single register file, however, is never under the simultaneous control of the IP and the RTU, as in other embodiments of the invention described above. Rather the IP assumes control of any register file for processing in response to, for example, status flags represented by dotted line 415, which may be set by either the IP or the RTU. The RTU assumes control of any register file for loading or for unloading data in response to both status flags represented by path 415 and status flags representing data states (404) in this embodiment.

In this embodiment RF status is indicated by status indicators (state flags) in five states, just as described above. In other embodiments there may be other ways for indicating register file state. That is: (1) in use by (under control of) the IP, (2) containing data to be stored (3) under control of the RTU for loading or for unloading data, (4) emptied of valid data and available, and (5) loaded with data ready for processing.

The IP is closely coupled to all register files while the register files are in state 1, as is true in most conventional processors, this coupling indicated by lines 416. The IP assumes control of an RF (408–412) in response to the RTU setting an RF status flag to state (5) and the IP being free to process new packet data, and, in assuming control, sets the status flag for the RF to state (1). Finishing with processing data in an RF, the IP releases (relinquishes) control, and sets the status flag to state (2). The RTU responds to a state (2) flag by assuming control of the RF, setting the state to state 3, and transferring valid data from the RF to cache 403 by controlling bus 405 via control connection 414. Having unloaded the RF the RTU sets the status flag to state (4). The RTU may also, in this process, set flags for data in the cache to indicate to other elements the disposition of the data (send as a data packet on the network, for example).

Data transferred into cache 403 to be processed in this embodiment causes flags to be set that are accessible to RTU 407, and RTU 407 responds to new data to be processed and an RF in state (4) by assuming control of the state (4) RF, setting the state of the RF to state 3, and loading it with the new data to be processed, again via controlling bus 405. After loading the RF the RTU sets the flag to state (5), so the IP will recognize new data to be processed when it is available to do so.

In this manner, RFs are loaded and unloaded with packet data in the background while the IP is utilized for the important work of processing data in the RFs, without being overloaded with data switching (load/unload) operations. The net result is a significant increase in processing power for the router.

It will be apparent to the skilled artisan that there are a variety of alterations and amendments that might be made in the embodiments of the invention described herein without departing from the spirit and scope of the invention. For example, there are many ways that logic for a register transfer unit as described may be implemented in silicon. Similarly, there is a broad latitude in the number and size of register files that might be implemented and used, and in the methods that may be used for transferring data into and out of the register file or files. Further, the skilled artisan will recognize that there are many alterations possible involving the number of streams, the number of register files, the number of register file states necessary in different embodiments, the way in which state information may be set and maintained, and so on. Further, implementations of the invention may be made in single chips, in chip sets, and there are many, many applications in the art for processors according to different embodiments of the invention. The invention is limited only by the breadth of the claims below.

What is claimed is:

1. An electronic processor, comprising:

at least two register files;

an instruction processor coupled to the at least two register files for processing instructions using data in the register files;

a memory; and a register transfer unit coupled to the at least two register files and the memory, transferring data between the register files and the memory;

wherein both the instruction processor and the register transfer unit are enabled to alter the states for the register files, and wherein the instruction processor and the register transfer unit take control of a register file only according to specific states of the register files, and a register file is never under control simultaneously of the register transfer unit and the instruction processor.

2. The electronic processing system of claim 1 wherein register files exist in any one of five states, a first state indicating a file is in use by the instruction processor, a second state indicating the register file is released by the instruction processor with valid data to be stored, a third state indicating the register file is under control of the register transfer unit, a fourth state indicating the register file has no valid data and is available, and a fifth state indicating the register file is loaded with valid data and is ready for processing by the instruction processor.

3. The electronic processing system of claim 2 wherein a register file passes from state 1, to state 2, to state 3 wherein the register transfer unit unloads valid data from the register file, to state 4, back to state 3 wherein the register transfer unit loads new valid data to the register file, to state 5, and back again to state 1.

4. The electronic processing system of claim 2 wherein a register file passes from state 1, directly to state 4, to state 3 wherein the register transfer unit loads new data, to state 5, and back again to state 1.

5. The electronic processing system of claim 2 wherein status is maintained for data as well as for register files, and wherein the register transfer unit takes control of a register file according to both a register file state and a data state.

6. The electronic processing system of claim 2 wherein data transferred into a register file constitutes a context switch.

7. The electronic processing system of claim 6, wherein the instruction processor causes a thread context to be stored in a specific register file, and to remain in the specific register file while plural context switches occur in one or more other register files.

8. The electronic processing system of claim 2 wherein the register transfer unit has at least one interrupt input, and wherein, in response to an interrupt on the interrupt input, the register transfer unit loads specific data to a register file and in turn interrupts the instruction processor.

9. The electronic processing system of claim 1 wherein the instruction processor, the first and second register files, and the register transfer unit are all implemented as semiconductor elements on a single chip.

10. The electronic processing system of claim 1 wherein the instruction processor, the first and second register files, the register transfer unit, and the data repository are all implemented as semiconductor elements on a single chip.

11. The electronic processing system of claim 1 wherein the processing system is a multi-streaming system having plural hardware streams, the instruction processor is capable of simultaneously processing instructions from plural threads running in the plural streams, and comprising a number of register files at least one more than the number of active streams, one register file then being available to be controlled by the register transfer unit while the instruction processor executes instructions in all of the active streams, controlling one register file for each of the active streams.

12. A method for transferring data between register files and a data repository in an electronic processor, comprising steps of:
(a) providing for register files to have unique states settable by either an instruction processor or a register transfer unit;
(b) assuming control of register files by the register transfer unit for transferring data only under specific first states for register files;
(c) assuming control of register files by the instruction processor for processing data in the register files only under a specific second state for register files; and
(d) setting state for a register file by either the register transfer unit or the instruction processor each time the register transfer unit or the instruction processor finishes operating with a register file.

13. The method of claim 12 wherein, in steps (b) and (c), an individual register file is never under control of the register transfer unit and the instruction processor simultaneously.

14. The method of claim 12 wherein register files exist in any one of five states, a first state indicating a file is in use by the instruction processor, a second state indicating the register file is released by the instruction processor with valid data to be stored, a third state indicating the register file is under control of the register transfer unit, a fourth state indicating the register file has no valid data and is available, and a fifth state indicating the register file is loaded with valid data and is ready for processing by the instruction processor.

15. The method of claim 14 wherein a register file passes from state 1, to state 2, to state 3 wherein the register transfer unit unloads valid data from the register file, to state 4, back to state 3 wherein the register transfer unit loads new valid data to the register file, to state 5, and back again to state 1.

16. The method of claim 14 wherein a register file passes from state 1, directly to state 4, to state 3 wherein the register transfer unit loads new data, to state 5, and back again to state 1.

17. The method of claim 14 wherein status is maintained for data as well as for register files, and wherein the register transfer unit takes control of a register file according to both a register file state and a data state.

18. The method of claim 12 wherein the processing system is a multi-streaming system having plural hardware streams, the instruction processor is capable of simultaneously processing instructions from plural threads running in the plural streams, and comprising a number of register files at least one more than the number of active streams, one register file then being available to be controlled by the register transfer unit while the instruction processor executes instructions in all of the active streams, controlling one register file for each of the active streams.

19. A method for context switching in an electronic processor having more register files than instruction streams, comprising steps of:
(a) assuming control of a first register file having a first valid context by an instruction processor, setting a state for the first register file to a first state indicating the register file is under control of the instruction processor, and executing instructions using data in the first register file;
(b) releasing control of the first register file by the instruction processor, and setting the state for the first register file to a second state indicating the register file is released by the instruction processor with valid data to be stored, and assuming control of a second register file in a fifth state by the instruction processor, the second register file having a second valid context, and setting the second register file to the first state indicating the second register file is under control of the instruction processor;
(c) assuming control of the first register file in the second state by a register transfer unit, setting the state of the register file to state 3, transferring data in the first register file to a data repository, and setting the first register file to a fourth state indicating the first register file is empty of valid data and available for a new context; and
(d) assuming control of the first register file in the fourth state by the register transfer unit, loading the first register file with a second valid context, and setting the first register file to the fifth state indicating the first register file has a valid context loaded and is ready for use by the instruction processor.

20. The method of claim 19 wherein, in step (a) the instruction processor checks for a register file in the fifth state as a precondition for assuming control of the register file.

21. The method of claim 19 wherein, in step (c) the register transfer unit checks for a register file in the second state as a precondition to assuming control and transferring valid data from the register file into the data repository.

22. The method of claim 19 wherein, in step (d) the register transfer unit checks for a register file in the fourth state as a precondition to loading the register file with a new valid context.

23. The method of claim 19 wherein, in step (d) the register transfer unit assumes control of a register file in state 4 as a result of an interrupt signal directed to the register transfer unit, and wherein the data loaded to the register file is specific to the interrupt.

24. A computing machine, comprising:
data input and data output apparatus;
an electronic memory; and
an electronic processing system having at least two register files, an instruction processor coupled to the at least two register files for processing instructions using data in the register files, a data repository, and a register transfer unit coupled to the at least two register files and the data repository;

wherein both the instruction processor and the register transfer unit are enabled to alter the states for the register files, and wherein the instruction processor and the register transfer unit take control of a register file only according to specific states of the register files, and a register file is never under control simultaneously of the register transfer unit and the instruction processor.

25. The computing machine of claim 24 wherein register files exist in any one of five states, a first state indicating a file is in use by the instruction processor, a second state indicating the register file is released by the instruction processor with valid data to be stored, a third state indicating the register file is under control of the register transfer unit, a fourth state indicating the register file has no valid data and is available, and a fifth state indicating the register file is loaded with valid data and is ready for processing by the instruction processor.

26. The computing machine of claim 25 wherein the register transfer unit has at least one interrupt input, and wherein, in response to an interrupt on the interrupt input, the register transfer unit loads specific data to a register file and in turn interrupts the instruction processor.

27. The computing machine of claim 25 wherein a register file passes from state 1, to state 2, to state 3 wherein the register transfer unit unloads valid data from the register file, to state 4, back to state 3 wherein the register transfer unit loads new valid data to the register file, to state 5, and back again to state 1.

28. The computing machine of claim 25 wherein a register file passes from state 1, directly to state 4, to state 3 wherein the register transfer unit loads new data, to state 5, and back again to state 1.

29. The computing machine of claim 25 wherein data transferred into a register file constitutes a context switch.

30. The computing machine of claim 29 wherein the instruction processor causes a thread context to be stored in a specific register file, and to remain in the specific register file while plural context switches occur in one or more other register files.

31. The computing machine of claim 24 wherein status is maintained for data as well as for register files, and wherein the register transfer unit takes control of a register file according to both a register file state and a data state.

32. The computing machine of claim 24 wherein the instruction processor, the first and second register files, and the register transfer unit are all implemented as semiconductor elements on a single chip.

33. The computing machine of claim 24 wherein the instruction processor, the first and second register files, the register transfer unit, and the data repository are all implemented as semiconductor elements on a single chip.

34. The computing machine of claim 24 wherein the processing system is a multi-streaming system having plural hardware streams, the instruction processor is capable of simultaneously processing instructions from plural threads running in the plural streams, and comprising a number of register files at least one more than the number of active streams, one register file then being available to be controlled by the register transfer unit while the instruction processor executes instructions in all active streams, controlling one register file for each of the active streams.

35. The computing machine of claim 34 wherein the data input and output apparatus comprises an application specific integrated circuit (ASIC) connected to a packet data network, the electronic memory comprises a data cache, and the computing machine is an Internet Protocol (IP) router dedicated to processing data packets.

36. An Internet Protocol (IP) data router, comprising:
a data cache;
a data interface connected to a data packet network for reading communicating data to and from the network through the data cache; and a multi-streaming processor comprising at least one more register file of multiple register files than active streams in the multi-streaming processor, the one more register file and one or more of the multiple register files coupled to the data cache by a bus, an instruction processor coupled to the one or more multiple register files separate from the bus, and a register transfer unit enabled to control the bus for transferring data between the register files and the data cache;
wherein the instruction processor assumes control of register files for processing instructions using the register files, and the register transfer unit assumes control of register files for transferring data between the register files and the data cache, and wherein control of register files is according to states set for the register files by either the instruction processor or the register transfer unit, no register file being under control of the register transfer unit and the instruction processor simultaneously.

37. An IP data router as in claim 36 wherein there are five states for any individual register file, a first state indicating the register file is controlled by the instruction processor, a second state indicating the register file has valid data, a third state indicating the register file is controlled by the register transfer unit, a fourth state indicating the register file is empty of data and available, and a fifth state indicating the register file is loaded with data to be processed.

38. The IP data router of claim 37 wherein, in releasing a register file in state 1 by the instruction processor the instruction processor sets the state to either state 2 or state 4, depending on presence of valid data to be stored in the register file, the register transfer unit, upon assuming control of a register file in state 2 sets the state to state 3, unloads data, and sets the state of the register file to state 4, the register transfer unit, upon assuming control of a register file in state 4 loads data to the register file and sets the state to state 5, and wherein the instruction processor, assuming control of a register file in state 5 sets the state to state 1.

* * * * *